US010402730B2

(12) United States Patent
Whitlow et al.

(10) Patent No.: US 10,402,730 B2
(45) Date of Patent: Sep. 3, 2019

(54) METHOD AND SYSTEM FOR DETERMINING WHETHER, WHEN, AND HOW AN UNMANNED AGENT INTERRUPTS A HUMAN

(71) Applicant: HONEYWELL INTERNATIONAL INC., Morristown, NJ (US)

(72) Inventors: Stephen Whitlow, St. Louis Park, MN (US); Erik T. Nelson, Morristown, NJ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 960 days.

(21) Appl. No.: 14/877,362

(22) Filed: Oct. 7, 2015

(65) Prior Publication Data

US 2017/0103323 A1    Apr. 13, 2017

(51) Int. Cl.
G06N 5/02 (2006.01)
G06F 9/48 (2006.01)
G06Q 10/06 (2012.01)

(52) U.S. Cl.
CPC ............ G06N 5/02 (2013.01); G06F 9/4818 (2013.01); G06Q 10/0631 (2013.01)

(58) Field of Classification Search
CPC ........ G06F 9/4818; G05D 1/104; G05D 1/00; B08B 9/049; B25J 11/008; B25J 11/0085; B25J 3/00
See application file for complete search history.

(56) References Cited

U.S. PATENT DOCUMENTS

| 6,714,967 | B1 | 3/2004 | Horvitz | |
|---|---|---|---|---|
| 7,457,879 | B2 | 11/2008 | Horvitz et al. | |
| 2012/0215348 | A1* | 8/2012 | Skrinde | B08B 9/049 700/245 |
| 2014/0074339 | A1* | 3/2014 | Casado | G05D 1/0088 701/24 |
| 2014/0074483 | A1* | 3/2014 | van Os | G10L 15/22 704/275 |
| 2014/0222248 | A1* | 8/2014 | Levien | B64C 39/024 701/2 |

(Continued)

FOREIGN PATENT DOCUMENTS

EP         1452988 A1   9/2004
WO    2014168730 A2  10/2014

OTHER PUBLICATIONS

'Enabling Improved Performance though a Closed-Loop Adaptive System Driven by Real-Time Assessment of Cognitive State': Dorneich, 2005, Foundations of Augmented Cognition.*

(Continued)

Primary Examiner — Robert A Cassity
Assistant Examiner — Peter D Coughlan
(74) Attorney, Agent, or Firm — Lorenz & Kopf, LLP

(57) ABSTRACT

A method and system for determining whether, when, and how an unmanned agent interrupts a human is provided. The provided method and system uses a two-step multivariate analysis to (i) process a request for human interaction to determine whether to interrupt a human, and (ii) determine when and how to interrupt the human. The provided method and system interrupts the human in a manner that reflects analysis of variables such as mission criticality, whether a delay in the mission is acceptable, and the propriety of interrupting the human.

16 Claims, 3 Drawing Sheets

(56) References Cited

U.S. PATENT DOCUMENTS

2014/0229405 A1    8/2014  Govrin et al.
2015/0139441 A1    5/2015  Kawalkar

OTHER PUBLICATIONS

'Evaluation of a Tactile Navigation Cueing System and Real-Time Assessment of Cognitive State': Dorneich, 2006, Human Factors and Ergonomics Society Annual Meeting Proceedings.*
'DARPA Improving Warfighter Information Intake Under Stress—Augmented Cognition': Morrison, 2006, Tech report 2914-, 9, 2006.*
'An Agent-Based Simulation Model of Human-Robot Team Performance in Military Environments': Giachettu, 2012, Systems ENgineering.*
Giachetti, et al.; An Agent-Based Simulation Model of Human-Robot Team Performance in Military Environments; Received Sep. 1, 2010: Revised Feb. 15, 2012; Accepted Feb. 15, 2012, after one or more revisions Published online Aug. 23, 2012 in Wiley Online Library (wileyonlinelibrary.com).
Extended EP Search Report for Application No. 16192291.9-1871 dated Feb. 24, 2017.
McCrickard S., "Attuning Notification Design to User Goals and Attention Costs," Mar. 2003.
EP Summons for Application No. 16192291.9 dated Jun. 28, 2018.
EP Communication for Application No. 16 192 291.9-1871 dated Sep. 28, 2017.

\* cited by examiner

METHOD AND SYSTEM FOR DETERMINING WHETHER, WHEN, AND HOW AN UNMANNED AGENT INTERRUPTS A HUMAN

TECHNICAL FIELD

Embodiments of the subject matter described herein relate generally to the interactions between unmanned agents and humans, more particularly, to a system and method for determining whether, when, and how an unmanned agent interrupts a human.

BACKGROUND

Along with an increasing availability of "intelligent" unmanned agents, trends in systems development are increasingly teaming humans with unmanned teammates to function across complex domains. Teaming humans with unmanned teammates may offer a variety of benefits, such as: reducing overall manned initiatives; reducing total human decision time in the course of a mission; and, flexible adaptation to dynamic and uncertain complexity in operational environments.

While effective human-human teams typically begin by developing highly efficient communication and decision mechanisms that promote the judicious engagement of other human teammates, a similar development in human-unmanned teammates is largely unrealized. In an operational setting, a team may comprise a single human operator (hereinafter, "human operator" is referred to as "human" for simplicity) that is responsible for a series of tasks and also responsible to be a mission manager for multiple unmanned teammates. Over the course of a mission, one or more of the unmanned teammates (referred to herein as unmanned agents (UAs)) may request human engagement on a mission task. In operational settings such as this, the attention or engagement of the human is limited and is one of the most valuable resources of the mission. Therefore, culling and prioritizing the requests for human engagement is necessary for highly efficient human-UA communication.

Accordingly, a method and system for determining whether, when, and how an unmanned agent interrupts a human is desirable. The desired method and system uses a two-step multivariate analysis to (i) process a request for human interaction to determine whether to interrupt a human, and (ii) if it determined to interrupt the human, to determine when and how to interrupt the human. The desired method and system interrupts the human in a manner that reflects analysis of variables such as mission criticality, whether a delay in the mission is acceptable, and the propriety of interrupting the human.

BRIEF SUMMARY

This summary is provided to introduce a selection of concepts in a simplified form that are further described below in the detailed description section. This summary is not intended to identify key features or essential features of the claimed subject matter, nor is it intended to be used as an aid in determining the scope of the claimed subject matter.

Provided is a method, executable by a processor, for managing requests for a human to interact with an unmanned agent. The method comprising: receiving a request comprising a mission and a mission task; retrieving, from a database, a human model reflective of the mission task; monitoring activities of the human to determine whether an interruptability level exceeds a predetermined interruptability threshold; determining whether to interrupt the human based on the mission, the mission task, and the human model; determining (i) whether a mission criticality exceeds a predetermined mission criticality threshold and (ii) whether a mission delay is acceptable; and when it is determined to interrupt the human, interrupting the human in a manner that reflects the interruptability level, the mission criticality, and the acceptability of a mission delay.

Also provided is a system for managing requests for a human to interact with an unmanned agent, the system comprising: a database comprising a human model for performing a mission task, mission information and mission task information; a display device; a user interface; and a processor coupled to the database, the user interface, and to the display, the processor configured to: receive a request comprising a mission and a mission task, retrieve, from the database, the human model reflective of the mission task, retrieve, from the database, mission information and mission task information, monitor activities of the human to determine whether an interruptability level exceeds a predetermined interruptability threshold, determine whether to interrupt the human based on the mission, the mission task, and the human model; determine (i) whether a mission criticality exceeds a predetermined mission criticality threshold and (ii) whether a mission delay is acceptable; and when it is determined to interrupt the human, interrupt the human in a manner that reflects the interruptability level, the mission criticality, and the acceptability of a mission delay.

Other desirable features will become apparent from the following detailed description and the appended claims, taken in conjunction with the accompanying drawings and this background.

BRIEF DESCRIPTION OF THE DRAWINGS

A more complete understanding of the subject matter may be derived from the following detailed description taken in conjunction with the accompanying drawings, wherein, like reference numerals denote like elements, and.

DETAILED DESCRIPTION

Figure 1:
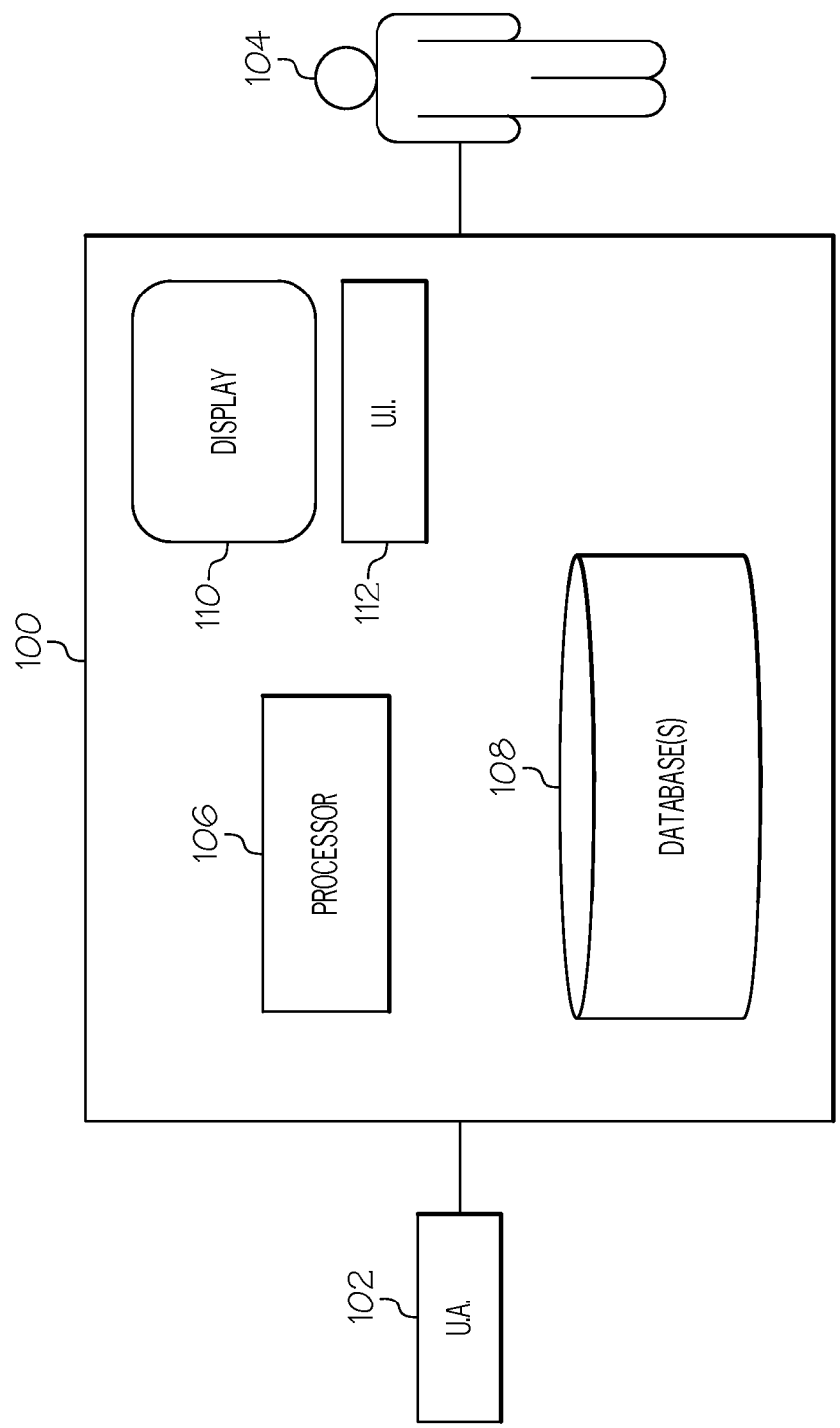
FIG. 1 is a simplified block diagram of a system for determining human interruption, according to an exemplary embodiment.

The following Detailed Description is merely exemplary in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over any other implementations. Furthermore, there is no intention to be bound by any expressed or implied theory presented in the preceding Technical Field, Background, Brief Summary or the following Detailed Description.

Techniques and technologies may be described herein in terms of functional and/or logical block components and with reference to symbolic representations of operations, processing tasks, and functions that may be performed by various computing components or devices. Operations, tasks, and functions are sometimes referred to as being a set of "instructions;" such instructions may be stored in memory or a database and then computer-executed, computerized, software-implemented, or computer-implemented. The instructions may also be converted into hardware using logic gates and/or a field programmable gate array (FPGA).

In practice, one or more processor devices can carry out the described operations, tasks, and functions by manipulating electrical signals representing data bits at memory locations in the system memory, as well as other processing of signals. The memory locations where data bits are maintained (for example a database) are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

The following descriptions may refer to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the drawings may depict one exemplary arrangement of elements, additional intervening elements, devices, features, or components may be present in an embodiment of the depicted subject matter.

As used herein, an "unmanned agent" (UA) means any robot, drone, unmanned asset, "unmanned organic asset," "software based intelligent agent," or similarly autonomous non-human teammate, typically including a processor and memory, and typically designed to perform at least one mission task. While not the subject of this invention, it is readily appreciated that a request for a human to interact/engage with a UA may come from a single UA, a plurality of UAs, and/or a system in communication with one or more UAs. The exemplary embodiment provides decision logic for a two-step multivariate analysis that determines, in response to receiving a request for human engagement, (i) whether to interrupt a human, and if so, (ii) when and how to interrupt the human. The desired system interrupts the human in a manner that reflects multivariate considerations such as mission criticality, whether a delay in the mission is acceptable, and the propriety of interrupting the human.

The provided multivariate analysis utilizes adjustable, predetermined thresholds to estimate the potential cost and benefits of interrupting the human with the request for human engagement. The multivariate analysis processes task criticality, task details, human task knowledge, human response time models, and the like. Rather than always interrupting the human in response to receiving a request for human engagement, the novel multivariate analysis provided herein advantageously interrupts the human only upon meeting predetermined thresholds. Further, the provided system and method interrupts the human in a manner that reflects urgency reflective of the results of the multivariate analysis. The following detailed description describes these novel features.

FIG. 1 is a simplified block diagram of a system for determining human interruption (hereinafter "HI determiner" for simplicity) 100, according to an exemplary embodiment. HI determiner 100 comprises processor 106, database 108, display 110, and user interface (UI) 112. Unmanned Agent (UA) 102 is coupled to HI determiner 100, via a direct electrical connection or wireless communication. The human 104 is in communication with the HI determiner 100. In the embodiment, the human 104 has access to user interface (UI) 112 and has an unobscured view of a display 110. In an embodiment, UI 112 and display 110 may reside external to the HI determiner 100.

In practice, processor 106 may comprise, or be associated with, any suitable number of individual microprocessors, mission control computers, navigational equipment, memories (such as database 108), power supplies, storage devices, interface cards, and other standard components known in the art. In this respect, the processor 106 may include or cooperate with any number of software models, software programs (e.g., aircraft display programs) or instructions designed to carry out the various methods, process tasks, calculations, and control/display functions described below.

Database 108 stores predetermined data for retrieval and processing during operation of the HI determiner 100. For example, database 108 stores human models reflective of mission tasks, such as human response time and human time to complete tasks, for a variety of mission tasks and subtasks. Database 108 may also store mission information, including the organization of mission tasks and subtasks, whether delays are acceptable for a given mission, mission criticality, predetermined thresholds, and mission task details. Database 108 may further include a domain task model that provides the system with information necessary to "reason" on what a UA does and does not know, as well as what information the human could likely provide, and in what amount of time. Information provided by the domain task models, in combination with elements of the incoming request, such as the corresponding mission and a time constraint for completing the task may be used to characterize the request and determine a predicted success of task execution. In an embodiment, database 108 stores all of the aforementioned information. In another embodiment, database 108 may comprise, for example, a first database to store human models, a second database to store mission information, and a third database to store domain task models.

The HI determiner 100 processes a request associated with one or more UAs 102 to determine whether to interrupt the human 104. In the embodiments presented herein, the processor 106 receives a request for human engagement ("a request"), and parses components from the request. The components of the request may include a mission, a mission task, and a time constraint reflecting the UAs 102 urgency for human engagement associated with the mission task. The exemplary embodiments may use components of the request to associate one or more variables from database 108 with the request, for example, to associate human modeling features such as human response time with respective tasks and subtasks. The details of a process for a HI determiner 100 are described in more detail in connection with FIG. 2.

As described above, when it is determined that a human operator should be interrupted, the system interrupts the human in a manner that reflects considerations such as mission criticality, whether a delay in the mission is acceptable, and the propriety of interrupting the human. Accordingly, display 110 may be employed for interrupting the human; the content and methodology for various "actions" used to interrupt the human in the exemplary embodiment are described in more detail hereinbelow. Display 110 may comprise any image-generating devices suitable for use as a display 110, and may take the form of a multi-function display (MFD), and/or include various analog (e.g., cathode ray tube) and digital (e.g., liquid crystal, active matrix, plasma, etc.) display devices. In certain embodiments, display 110 may assume the form of a Head-Down Display (HDD) or a Head-Up Display (HUD).

During operation of the HI determiner 100, the processor 106 may command the display 110 to render a displayed image that provides mission information. In some embodiments, the mission information is displayed in the form of a project management or mission timeline (FIG. 3 302), having tasks and subtasks placed on the timeline at a location that is reflective of when the respective task or subtask must start and end. Additionally, the processor 106 may generate message data and may command the display 110 to overlay the displayed image with message data associated with the HI determiner 100.

Figure 2:
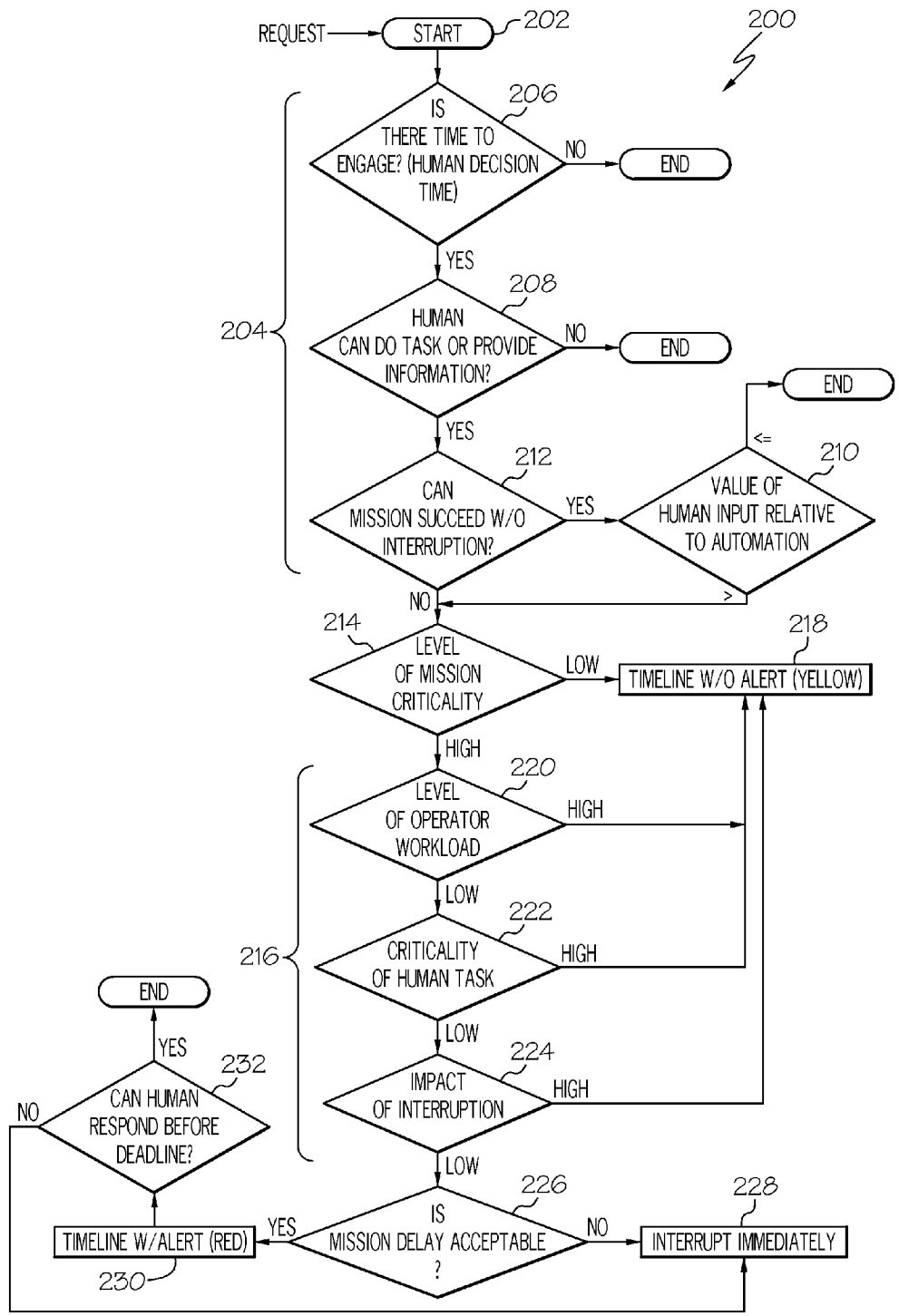
FIG. 2 is a flow diagram of an exemplary process for a human interruption determiner, suitable for use with the system of FIG. 1, in accordance with one or more embodiments.

FIG. 2 is a flow diagram of an exemplary HI determiner process 200 suitable for use with the system of FIG. 1, in accordance with one or more embodiments. HI determiner process 200 is executable by a processor, and manages requests for a human to interact with an unmanned agent (UA) 102. The source of a request may be one or more UAs 102, a system that is in communication with a UA 102, or any similar source. A request starts the HI determiner process 200 (STEP 202). The request may comprise individual components such as, a mission, a mission task, and a time constraint. The processor 106 parses the request into its individual components and uses the individual components to retrieve variables from database 108. The mission task is used to retrieve, from database 108, a human model comprising details associated with a human 104 performing the mission task. Details associated with a human 104 performing a mission task include, but are not limited to: whether or not the human 104 can perform the mission task, human decision time for the mission task, human task completion times, and whether the value of human input for the mission task is greater than the value of a default solution that may be provided by the requesting UA 102. Processor 106 processes at least the mission, the mission task, and the human model in STEP 204, to determine whether to interrupt the human 104. STEPs 206-212 (collectively referred to as STEP 204) describe an embodiment of the processor 106 utilizing individual details associated with a human performing the mission task in the determination of whether to interrupt a human 104.

In STEP 206, the processor 106 determines, based on a human response time associated with the mission task and the time constraint provided in the request, whether there is time to engage the human. In STEP 208 the processor 106 processes the task and the human model to determine whether the human can perform the task. In STEP 210, processor 106 processes the mission task and the human model to determine whether the value of human input for the mission task is greater than the value of a default solution that may be provided by the requesting UA 102. In STEP 212, the processor 106 processes the mission and the mission task to determine whether the mission can succeed without interrupting the human 104.

In the embodiment, the HI determiner process 200 parses the mission from the incoming request and uses the mission to retrieve, from a database 108, an associated mission criticality. The HI determiner process 200 determines whether the mission criticality exceeds a predetermined mission criticality threshold at STEP 214.

The HI determiner process 200 also continuously monitors activities of the human 104 and processes them to determine the propriety of interrupting the human. As used herein, the propriety of interrupting a human is referred to as the "interruptablity" of the human, and the HI determiner process 200 determines whether an "interruptability" level of the human 104 exceeds a predetermined "interruptability threshold." Monitoring the activities of the human may comprise, for example, keeping track of human interaction with a UI 112, keeping track of a current task that the human is engaged in, and keeping track of a location on a project management timeline (FIG. 3, 302) that corresponds to the human's progress on a project. In the embodiment, determining the "interruptability" level (STEP 216) comprises: a determination of whether the level of workload exceeds a predetermined workload threshold (STEP 220); a determination of whether a task that the human is presently engaged in exceeds a predetermined criticality threshold (STEP 222); and a determination of whether the impact of interruption of the human is high (STEP 224). In STEP 226, HI determiner process 200 determines whether a mission delay is acceptable.

As mentioned, if HI determiner process 200 determines to interrupt the human, the human is interrupted in a manner that reflects the interruptability level, the mission criticality, and the acceptability of mission delay (STEPS 218, 228, and 230). In the embodiment, the "manner of interrupting" the human 104 is referred to as an "action," and three different actions are provided as an example. Each of the three actions provided by the exemplary embodiment is an alert that concurrently (i) interrupts the human 104 and (ii) communicates a level of urgency to the human 104. The exemplary three levels of urgency may roughly translate to an amber (low) alert, red alert, and (substantially) immediate alert. What follows is a detailed description of the determination, by the provided decision logic, of three levels of urgency for a request for human engagement, followed by examples of using display 110 in the actions to interrupt the human 104 in a manner that communicates a level of urgency. One with skill in the art will readily appreciate that the three actions described are merely exemplary, and other actions may be performed without straying from the scope of the invention.

If the mission criticality of the mission does not exceed the predetermined mission criticality threshold (i.e., the mission criticality is low), the human is interrupted via the HI determiner process 200 generating a first action (STEP 218). The HI determiner process 200 also generates the first action (STEP 218) if both (i) the mission criticality exceeds the predetermined mission criticality threshold and (ii) the interruptability level exceeds the predetermined interruptability threshold. In the exemplary embodiment, the first action is substantially an amber, or low alert.

In contrast, the HI determiner process 200 generates a second action (STEP 228), which may be a substantially immediate interruption, upon all three of: (i) the mission criticality exceeds the predetermined mission criticality threshold (STEP 214), (ii) the interruptability level exceeds the predetermined interruptability threshold (STEP 216), and (iii) a mission delay is not acceptable (STEP 226).

The HI determiner process 200 generates a third action (STEP 230), which may be a red alert, upon all three of: (i) the mission criticality exceeds the predetermined mission criticality threshold (STEP 214), (ii) the interruptability level does not exceed the predetermined interruptability threshold (STEP 216), and (iii) a mission delay is acceptable (STEP 226).

In an embodiment, the HI determiner process 200 detects whether the human responds to the third action within a predetermined temporal deadline (STEP 232); and if the human does not respond before the predetermined temporal deadline, generates the second action (STEP 228). Detecting whether the human responds to the third action within a predetermined temporal deadline (STEP 232) may include, for example, detecting an input on a UI 112, detecting human engagement with an originator of the request, and determining whether the human 104 begins to perform duties associated with the requested task, wherein said duties have been retrieved from a database 108.

Figure 3:
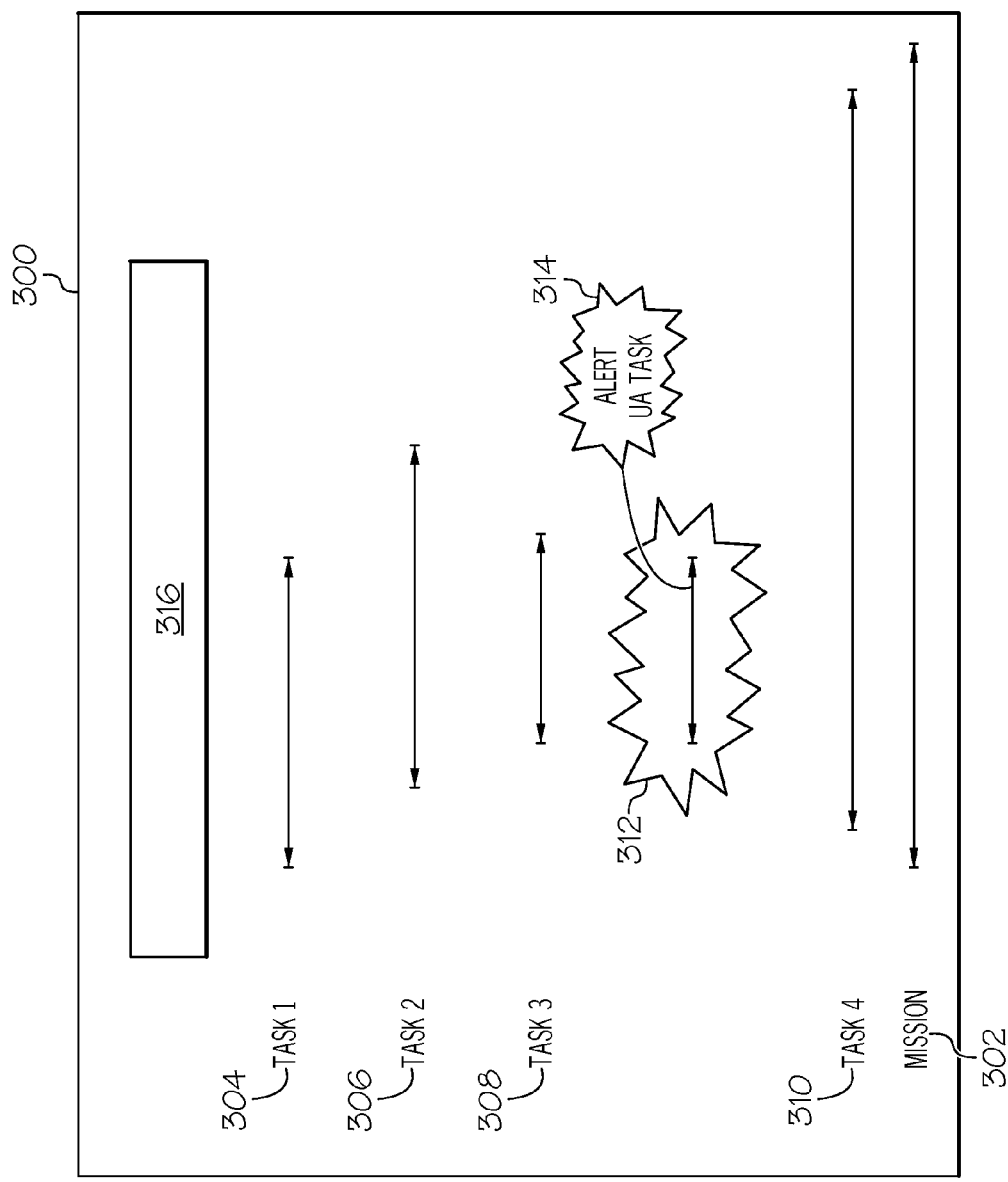
FIG. 3 is a simplified drawing of a display showing actions for interrupting a human, in accordance with one or more embodiments.

FIG. 3 is a simplified drawing of a display showing actions for interrupting a human, in accordance with one or more embodiments. Display 300 includes task 1 304, task 2 306, task 3 308, and task 4 310. Symbol 312 and text 314 comprise an alert to interrupt the human. Notably, the alert is placed between task 3 308 and task 4 310 on the mission timeline 302.

In the embodiment, the first action (STEP 218), second action (STEP 228), and third action (STEP 230) may comprise rendering symbology on a display 300. In an embodiment, the first action (STEP 218) and third action (STEP 230) each comprise overlaying a symbol 312 at a location on a mission timeline 302 that is reflective of a time that the task should be addressed, and distinguishing the first action (STEP 218) from the third action (STEP 230) with one or more combinations of symbols and various visually distinguishing display techniques, such as color, font size and style changes, flashing, interrupted lines and/or boundaries, transparency, hatching, and the like (For example, the first action may be an amber colored alert and the third action may be a red alert). A first action (STEP 218), and a third action (STEP 230) may each have associated text 314.

In an embodiment, the second action (STEP 228), used to communicated the highest level of urgency, may generate a substantially immediate interruption. The second action (STEP 228) may comprise rendering symbolic and textual instructions in a text box 316 on display 110 using the various visually distinguishable display techniques as described above, and text box 316 may further expand to take up the viewable space on display 300. The second action (STEP 228) may additionally comprise generating a haptic alert, such as to a UI 112, and/or generating an aural alert.

In an embodiment, the first action (STEP 218), second action (STEP 228), and third action (STEP 230) may each be terminated in various ways, for example, with user input via the UI 112, by detecting human 104 engagement with an originator of the request, and by determining whether the human 104 begins to perform duties associated with the requested task. Furthermore, although the above described process follows a single request through to the end of the decision logic, it is contemplated that the HI determiner process 200 is capable of continuously receiving requests for human engagement and processing them in parallel.

Thus, there has been provided a method and system for determining whether, when, and how an unmanned agent interrupts a human. The provided method and system uses a two-step multivariate analysis to (i) process a request for human interaction to determine whether to interrupt a human, and (ii) if it determined to interrupt the human, to determine when and how to interrupt the human. The provided method and system interrupts the human in a manner that reflects analysis of variables such as mission criticality, whether a delay in the mission is acceptable, and the propriety of interrupting the human.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method for managing requests from autonomous unmanned agents (UAs) on a mission with a human for engagement with the human, the method comprising:

at a human interruption (HI) determiner in direct electrical connection with multiple UAs, the HI determiner comprising a processor and a software program, the processor, when executing the software program, performs operations comprising:

receiving, from a UA of the multiple UAs, a request for the human to interact with the UA on a mission task that the UA is able to complete, as a default solution, without the human, the request comprising the mission and the mission task;

processing the mission and mission task to determine whether the mission can succeed without interrupting the human;

retrieving, from a database, a human model reflective of the mission task, the human model comprising a human task completion time for the mission task and whether a value of human input for the mission task is greater than a value of the default solution that the UA is able to complete;

determining to interrupt the human (i) when the value of human input for the mission task is greater than the value of a default solution, and (ii) when the mission cannot succeed without interrupting the human; and upon determining to interrupt the human, (a) determining whether a mission criticality exceeds a predetermined mission criticality threshold;

(b) monitoring activities of the human to determine whether an interruptability level exceeds a predetermined interruptability threshold, wherein monitoring activities comprises keeping track of a current task that the human is engaged in;

(c) determining whether a mission delay is acceptable; and (d) interrupting the human in a manner that reflects the interruptability level, the mission criticality with respect to the predetermined mission criticality threshold, and the acceptability of a mission delay;

wherein the step of interrupting the human in a manner that reflects the interruptability level, the mission criticality, and the acceptability of mission delay comprises generating a first action if the mission criticality does not exceed the predetermined mission criticality threshold.

2. The method of claim 1, wherein the step of interrupting the human in a manner that reflects the interruptability level, the mission criticality, and the acceptability of mission delay comprises generating the first action if both (i) the mission criticality exceeds the predetermined mission criticality threshold and (ii) the interruptability level exceeds the predetermined interruptability threshold.

3. The method of claim 2, wherein the step of interrupting the human in a manner that reflects the interruptability level, the mission criticality, and the acceptability of mission delay comprises generating a second action upon all three of: (i) the mission criticality exceeds the predetermined mission criticality threshold, (ii) the interruptability level does not exceed the predetermined interruptability threshold, and (iii) a mission delay is not acceptable.

4. The method of claim 3, wherein the step of interrupting the human in a manner that reflects the interruptability level, the mission criticality, and the acceptability of mission delay comprises generating a third action upon all three of: (i) the mission criticality exceeds the predetermined mission criticality threshold, (ii) the interruptability level does not exceed the predetermined interruptability threshold, and (iii) a mission delay is acceptable.

5. The method of claim 4, further comprising:
   detecting whether the human responds to the third action within a predetermined temporal deadline; and
      if the human did not respond before the predetermined deadline, generating the second action.

6. The method of claim 4, wherein the first action, second action, and third action comprise rendering symbology on a display, and wherein the symbology rendered on the display for each of the first action, second action, and third action are visually distinguishable from each other.

7. The method of claim 6, wherein the second action further comprises generating aural or haptic feedback.

8. The method of claim 1, wherein monitoring activities of the human to determine whether an interruptability level exceeds a predetermined interruptability threshold comprises monitoring: (i) an amount of work, (ii) a criticality of work, and (iii) an impact of interruption.

9. The method of claim 1, wherein the request further comprises a time constraint and wherein determining whether to interrupt the human further comprises processing the time constraint and the human model to determine whether there is time to engage the human.

10. The method of claim 9, wherein determining whether to interrupt the human further comprises processing the mission task and the human model to determine whether the human can perform the mission task.

11. A human interruption (HI) determiner for managing requests from unmanned agents (UAs) on a mission with a human for engagement by the human, the system comprising:
   a database comprising human models for performing mission tasks, mission information and mission task information;
   a display device;
   a user interface; and
   a processor coupled to the database, the user interface, the display, and in direct electrical connection with multiple UAs, the processor, when executing a software program, configured to:
      receive, from a UA of the multiple UAs, a request for the human to interact with the UA on a mission task that the UA is able to complete, as a default solution, without the human, the request comprising the mission and the mission task,
      process the mission and mission task to determine whether the mission can succeed without interrupting the human;
      retrieve, from the database, the human model for the mission task, comprising a human task completion time for the mission task and whether a value of human input for the mission task is greater than a value of the default solution that the UA is able to complete,
      determine to interrupt the human (i) when the value of human input for the mission task is greater than the value of a default solution, and (ii) when the mission cannot succeed without interrupting the human; and
   upon determining to interrupt the human,
      (a) determine whether a mission criticality exceeds a predetermined mission criticality threshold;
      (b) monitor activities of the human to determine whether an interruptability level exceeds a predetermined interruptability threshold, wherein monitoring activities comprises keeping track of a current task that the human is engaged in,
      (c) determine whether a mission delay is acceptable; and
      (d) interrupt the human in a manner that reflects the interruptability level, the mission criticality with respect to the predetermined mission criticality threshold, and the acceptability of a mission delay;
   wherein the processor is further configured to interrupt the human in a manner that reflects the interruptability level, the mission criticality, and the acceptability of mission delay by generating a first action if the mission criticality does not exceed the predetermined mission criticality threshold.

12. The system of claim 11, wherein the processor is further configured to interrupt the human in a manner that reflects the interruptability level, the mission criticality, and the acceptability of mission delay by generating the first action if both (i) the mission criticality exceeds the predetermined mission criticality threshold and (ii) the interruptability level exceeds the predetermined interruptability threshold.

13. The system of claim 12, wherein the processor is further configured to interrupt the human in a manner that reflects the interruptability level, the mission criticality, and the acceptability of mission delay by generating a second action upon all three of: (i) the mission criticality exceeds the predetermined mission criticality threshold, (ii) the interruptability level does not exceed the predetermined interruptability threshold, and (iii) a mission delay is not acceptable.

14. The system of claim 13 wherein the processor is further configured to interrupt the human in a manner that reflects the interruptability level, the mission criticality, and the acceptability of mission delay by generating a third action upon all three of: (i) the mission criticality exceeds the predetermined mission criticality threshold, (ii) the interruptability level does not exceed the predetermined interruptability threshold, and (iii) a mission delay is acceptable.

15. The system of claim 14, wherein the first action, second action, and third action comprise rendering symbology on a display, and wherein the symbology rendered on the display for each of the first action, second action, and third action are visually distinguishable from each other.

16. The system of claim 15, wherein the second action further comprises generating aural or haptic feedback.

* * * * *